(12) United States Patent
Grow

(10) Patent No.: US 6,629,147 B1
(45) Date of Patent: Sep. 30, 2003

(54) SEGMENTATION AND REASSEMBLY OF DATA FRAMES

(75) Inventor: Robert M. Grow, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,925

(22) Filed: Mar. 31, 2000

(51) Int. Cl.[7] ............................................. G06F 15/16
(52) U.S. Cl. ..................... 709/236; 709/238; 370/470; 340/825
(58) Field of Search .................. 709/2 S, 236, 709/238; 370/394, 470–476; 340/825, 826, 827

(56) References Cited

U.S. PATENT DOCUMENTS

| | | | | |
|---|---|---|---|---|
| 5,311,509 A | * | 5/1994 | Heddes et al. | 361/686 |
| 5,390,174 A | * | 2/1995 | Jugel | 370/392 |
| 5,485,453 A | * | 1/1996 | Wahlman et al. | 370/389 |
| 5,898,688 A | * | 4/1999 | Norton et al. | 370/362 |
| 6,483,854 B1 | * | 11/2002 | Klausmeier et al. | 370/474 |

\* cited by examiner

*Primary Examiner*—David Wiley
*Assistant Examiner*—Phuoc Nguyen
(74) *Attorney, Agent, or Firm*—Pillsbury Winthrop LLP

(57) ABSTRACT

A system and method of transmitting data frames between a plurality of input ports to a plurality of output ports is described. The input ports segment portions of the received data frames to provide smaller data cells which are individually transmitted to an output port associated with a destination of the segmented data frame. Based upon information provided in the data cells received at the output port, the output port determines the ordinal positions of the received data cells within the segmented data frame and reassembles the data frame which was segmented at the input port. The output port then forwards the reassembled frame toward the associated destination.

15 Claims, 8 Drawing Sheets

SEGMENTATION AND REASSEMBLY OF DATA FRAMES

BACKGROUND

1. Field of the Invention

Embodiments described herein are directed to data networks. In particular, embodiments described herein relate to transmitting data from several data sources to several destinations.

2. Related Art

The increased speed and volume of random access memories (RAM) between nodes in data communication networks have potentially increased the speed at which local area networks (LANs) and wide area networks (WANs) transmit data between two given points in a network. These networks typically include switches or bridges having one or more input ports for receiving packetized data from sources, and one or more output ports for transmitting data a received at the input ports to physical destinations in the network.

Data switches typically employ switching fabrics which couple the input ports to the output ports. Data frames received at the input ports are typically temporarily stored in RAM at the switching fabric before being transmitted to the output port associated with a desired destination. In one type of large capacity switches, data frames are typically received at input ports, segmented into smaller data cells and then transmitted to destination output ports. Here, a centralized arbitration logic manages the segmentation transmission and reassembly of the data frames for transmission from receiving input ports to destination output ports. Unfortunately, this centralized arbitration logic becomes increasingly complex as the size (i.e., the number of ports) of the switching fabric increases. Also, such centralized arbitration logic typically diminishes the performance of the switching fabric as the number of ports becomes large.

Data switches have typically employed crossbars for interconnecting multiple ports where each input port is coupled to any of the output ports. Integrated circuit implementations of such crossbar circuitry are typically designed for a set number of ports. Current crossbar architectures typically require a geometric increase in the number of integrated circuits to increase the number input ports beyond the size of a single crossbar chip. Accordingly, there is a need for a switching fabric architecture which can be scaled to incorporate additional numbers of input and output ports without a corresponding geometric increase in a number of integrated circuits required for transmitting data frames from the input ports to the output ports.

DETAILED DESCRIPTION

Embodiments of the present invention are directed to a system and method of transmitting data frames between a plurality of input ports and a plurality of output ports. The input ports segment portions of the received data frames to provide smaller data cells which are individually transmitted via a logical crossbar to an output port associated with a destination of the segmented data frame. Based upon information provided in the data cells received at the output port, the output port determines the ordinal positions of the received data cells within the segmented data frame and reassembles the data frame which was segmented at the input port. The output port then forwards the reassembled frame toward the associated destination.

Figure 1:
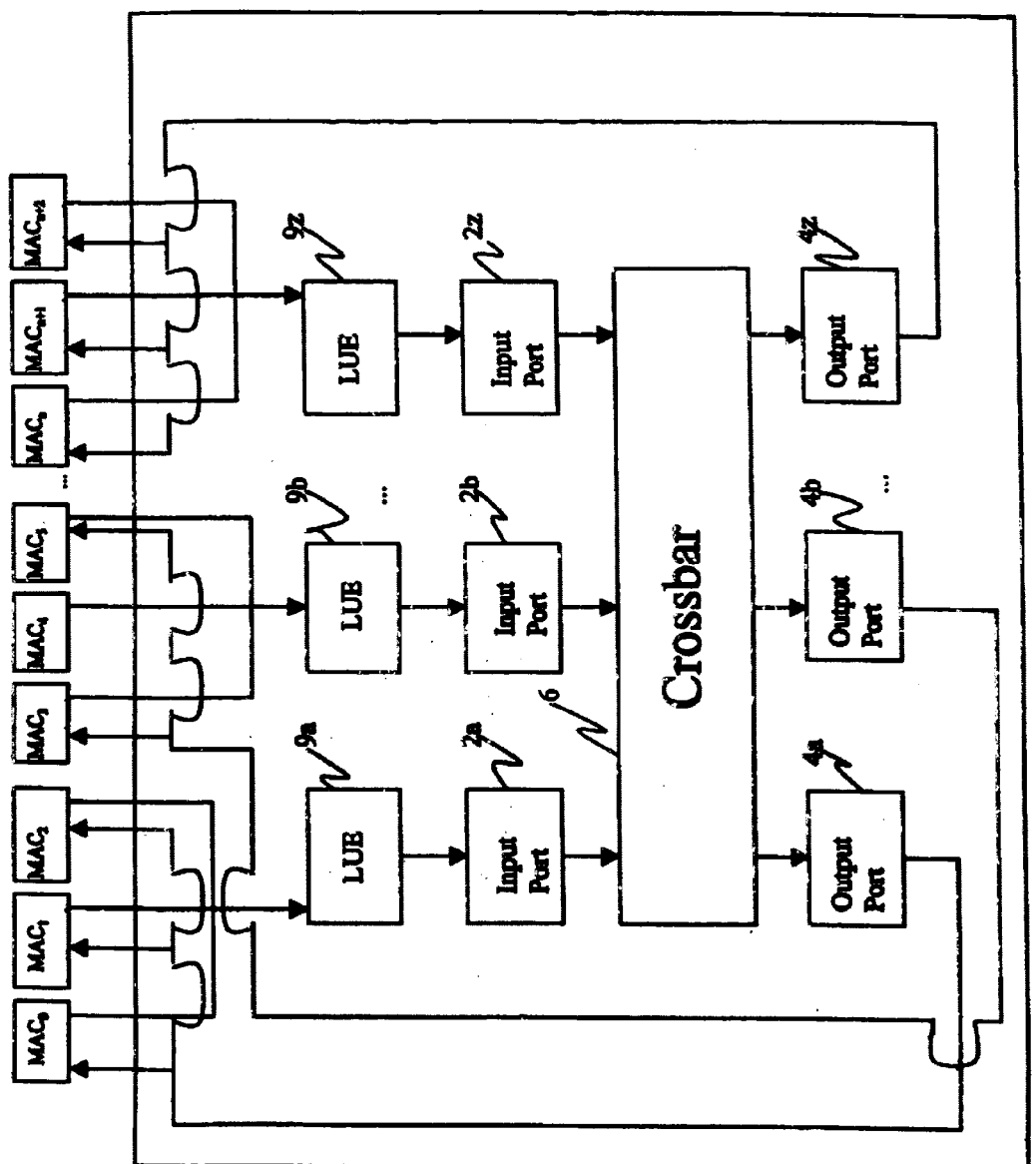
FIG. 1 shows the topology of a data switch employing a switching fabric according to an embodiment of the present invention.

FIG. 1 shows a data switch 7 for transmitting data packets between MAC devices $MAC_0$ through $MAC_{n+2}$. Each MAC device is associated with an input port 2 and an output port 4. Each MAC device receives data packets having a destination associated with one of the other MAC devices. The MAC devices forward data frames (based upon the received data packets) to a corresponding input port 2. The input port 2 then transmits the data frames through a crossbar 6 to an output port 4 corresponding with the MAC device associated with the destination of the data frame.

Prior to receipt of data frames at the input ports 2, the data frames are initially processed at a corresponding look up engine (LUE) 9. Each data frame received at an LUE 9 from a source MAC device includes destination information corresponding with one or more of the other MAC devices. The LUE 9 associates this destination information with an output port 4, and provides information identifying the output port 4 in an intermediate data frame to be transmitted to the input port 2 coupled to the LUE 9. Based upon the information in the intermediate data frame identifying the output port 4, the input port 2 may then initiate the transmission of the intermediate data frame through the crossbar 6 to the output port 4 associated with the destination of the data frame received at the LUE 9.

Figure 2:
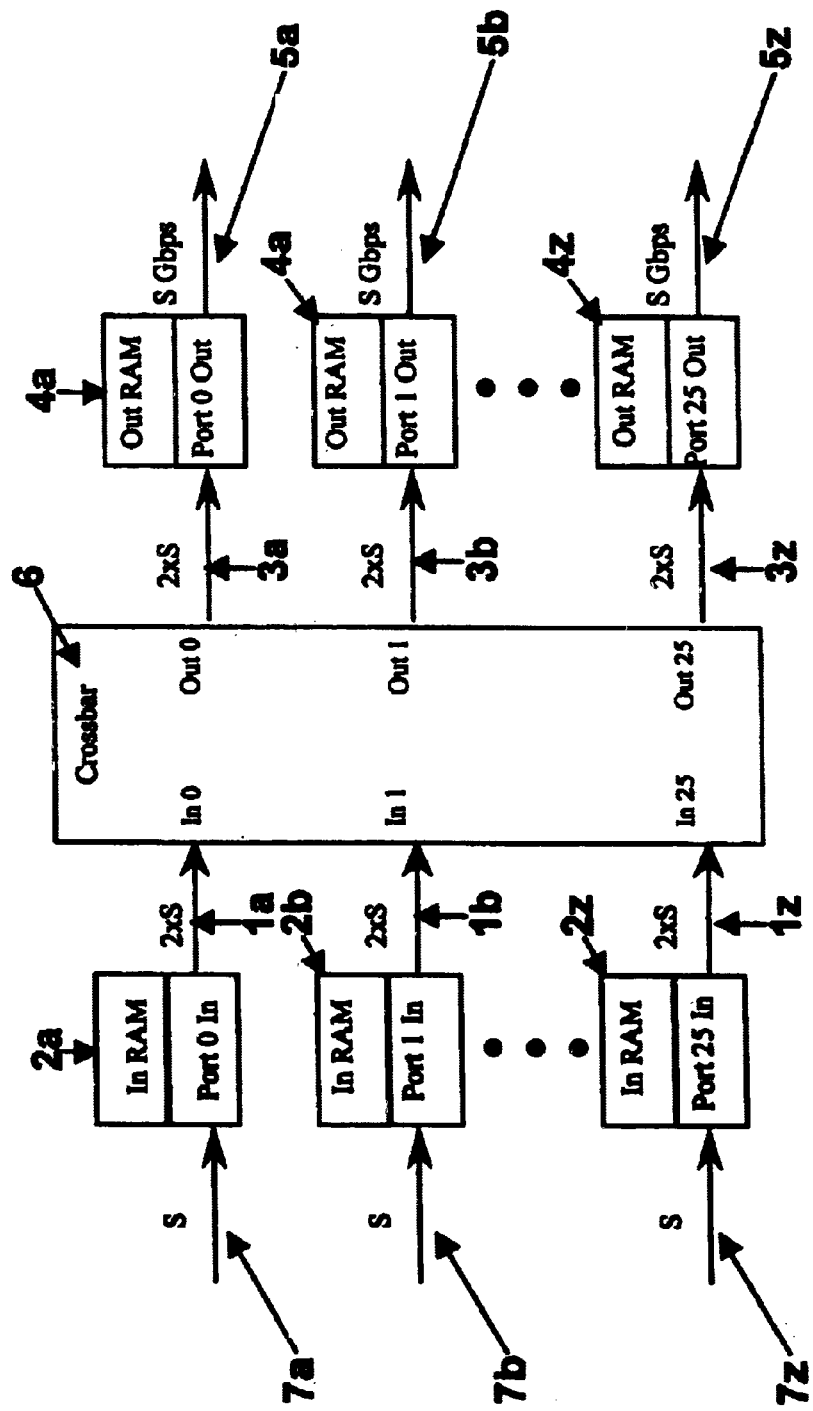
FIG. 2 shows a schematic drawing illustrating a switching fabric according to an embodiment of the switching fabric illustrated in FIG. 1.

In the embodiment of FIG. 2, each of the input ports receives data at a rate S (e.g., 8.0 Gbps) and transmits data to the crossbar 6 at a rate of two times S (e.g., 16.0 Gbps). Buffering at the crossbar 6 using RAM in combination with the increased rate of transmission between the input ports and the crossbar 6 enables frames to be forwarded to the output ports 4 at a rate greater than the media speed (i.e., the data rate at which data frames are received at the input ports 2).

Figure 3:
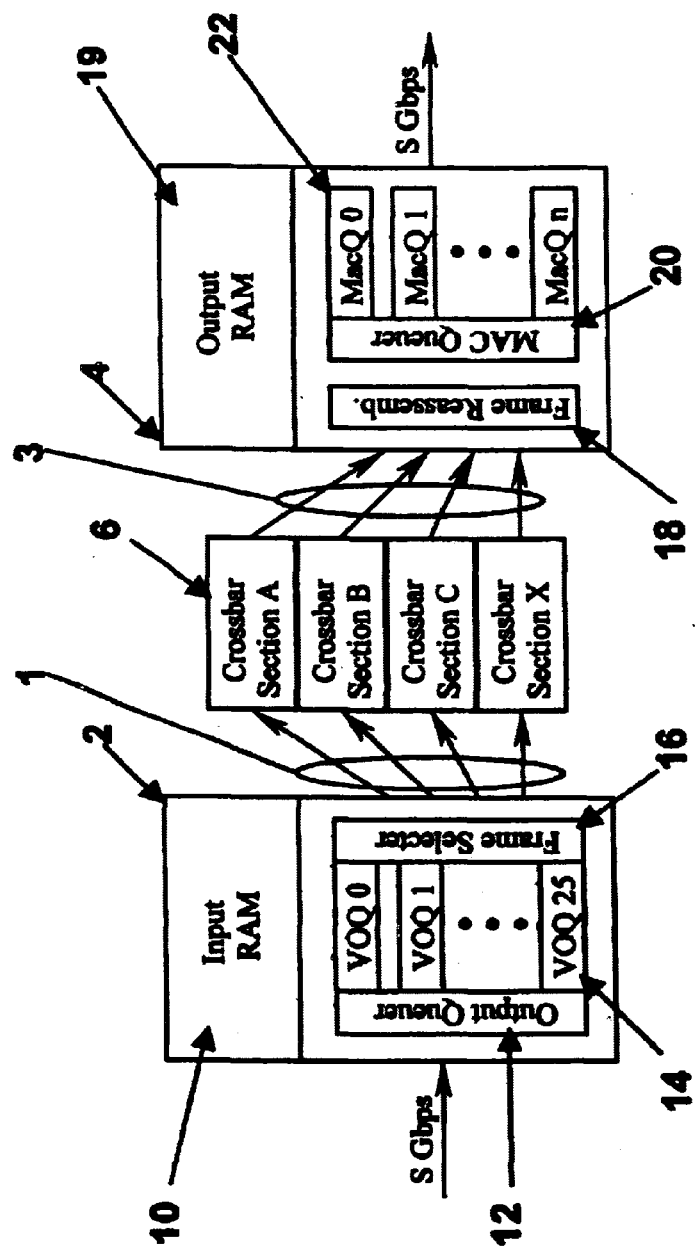
FIG. 3 illustrates the components of a single input port and a single output port coupled by sections of a crossbar according to an embodiment of the switching fabric of FIG. 2.

FIG. 3 shows an embodiment of input port 2 and output port 4 in the switching fabric of FIG. 2. A corresponding LUE 9 (FIG. 1) determines the destination output ports 4 for each data frame received at an input port 2 and identifies the output port 4 in the header of the data frame received at the input port 4. Each input port 2 maintains at least one virtual output queue (VOQ) 14 in a RAM buffer for each output port 4. The size of the RAM buffer may be selected based upon the input media speed relative to the aggregate data rate from an input port 2 to the crossbar 6.

Figure 4A:
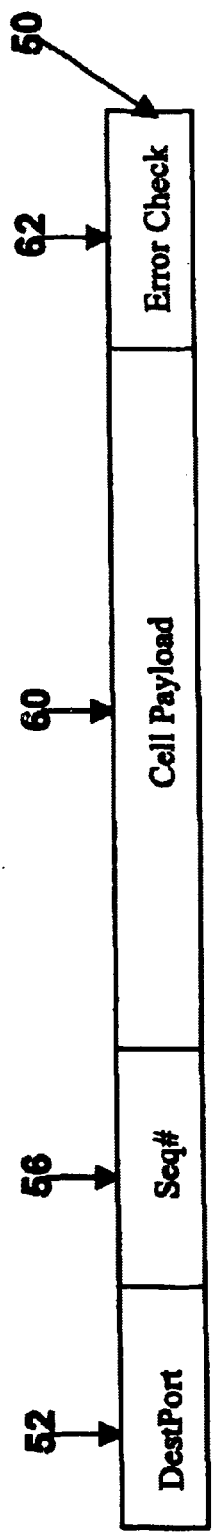
FIGS. 4a and 4b show the composition of a data cell according to the embodiment of FIG. 3.

A frame selector 16 selects frames to be forwarded across the crossbar 6 to the output ports 4. To provide for efficient forwarding of the frames, the frame selector 16 partitions the data payload of the received data frame and appends each partition to header information to provide a data cell 51 as shown in FIG. 4a. The input ports 2 communicate with sections 100 of the crossbar 6 to manage output congestion at each crossbar section as illustrated with reference to FIGS. 5 and 6. Such output congestion can occur if a data cell cannot be forwarded to an output port 4 because of an unavailability of locations in output queues 102 of a crossbar section 100.

Figure 5:
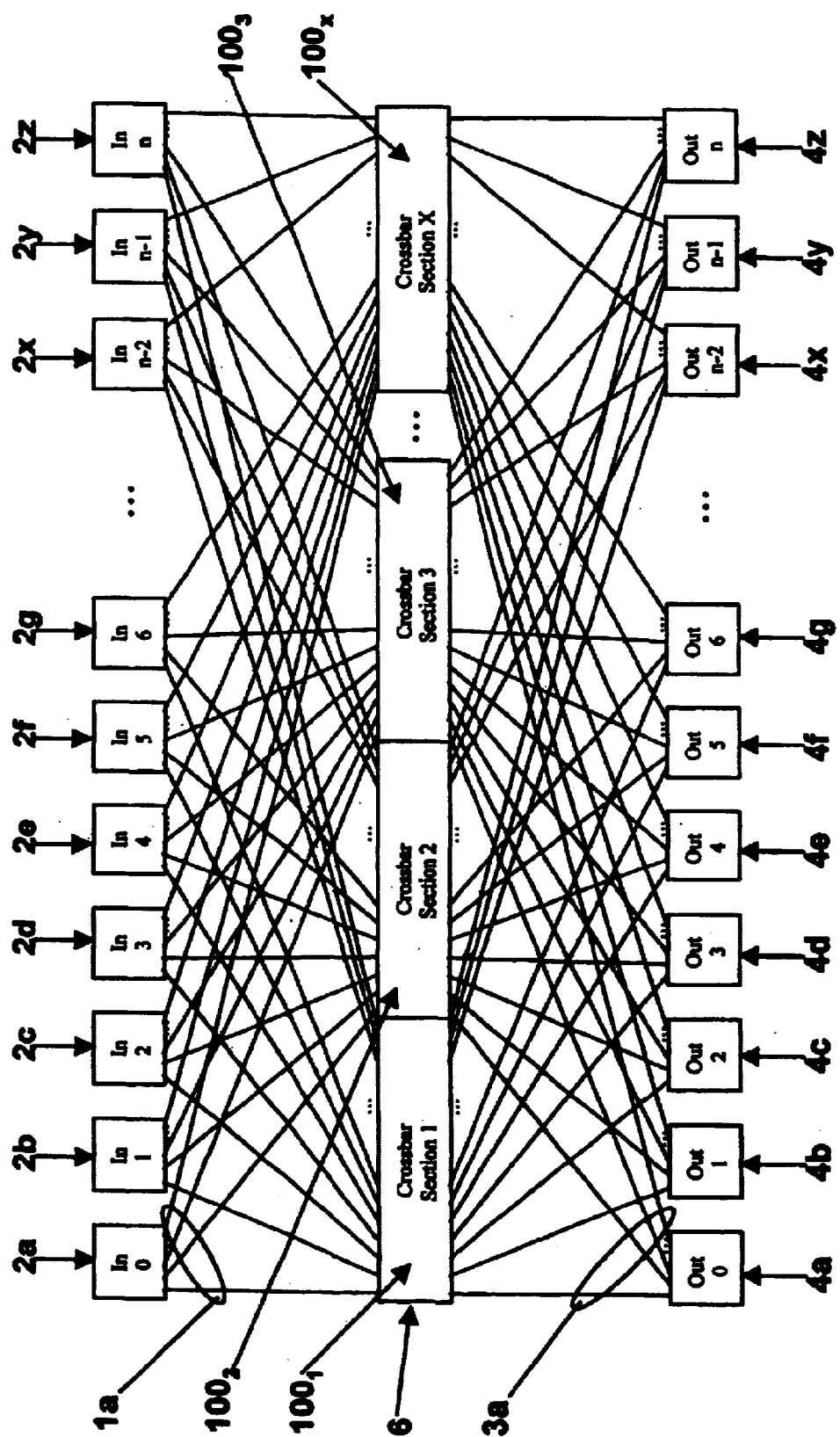
FIG. 5 shows a switching fabric topology illustrating an interconnection of each crossbar section with each input port and output port of the switching fabric illustrated in FIG. 2.

FIG. 3 shows the crossbar 6 as including four crossbar sections. In other embodiments, the crossbar 6 may include fewer or more sections, each section being coupled to receive data from any one of the input ports 2 and transmit data to any one of the output ports 4 as shown in FIG. 5. According to an embodiment, the aggregate data rate on links 1 between an input port 2 and a section of the crossbar 6 is twice that of the rate of data being received at the input port 2. This mesh of links, transmitting data from the input ports 2 to the crossbar sections at a rate twice that at which data is received at the input ports, relieves output port congestion and reduces the incidence of head of line blocking.

Each output port 4 includes an output RAM 19 and an ASIC portion. The ASIC portion includes a frame reassembler 18 and a MAC queuer 20 for maintaining a frame transmit queue for each MAC device associated with the output port 4. Logic at the output 4 indicates the availability of buffer space for the receipt of additional cells from the crossbar 6. Data cells from the crossbar 6 are placed in proper sequence within the output RAM 19 to reconstruct frames. When frames are reassembled and buffered within the output RAM 19, the output MAC queuer 20 can place a frame into an appropriate queue associated with the destination MAC device.

Figure 4B:
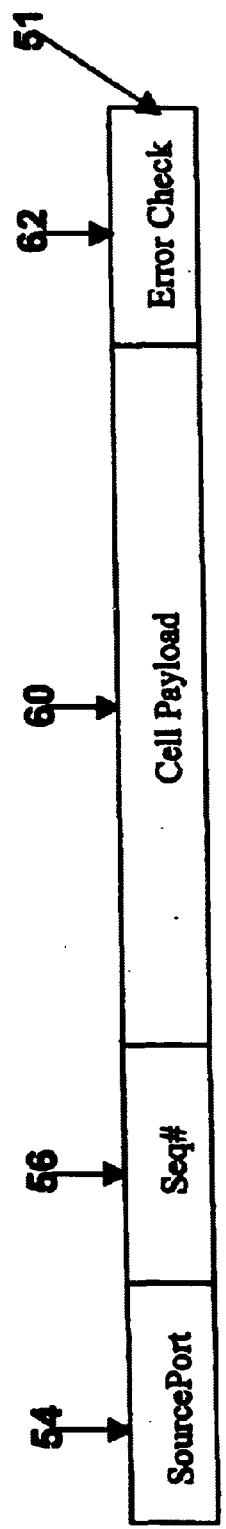

According to IEEE standard 802.1 frame order must be maintained within a context associated with a specific network address. According to an embodiment, a frame is not enqueued in a MAC queue 22 until all frames required to be transmitted first (to maintain frame order) are enqueued. This can be implemented by ordering data cells received at the output port 4 according to the sequence number 56 in a field of the data cells as illustrated in FIGS. 4a and 4b discussed below. A frame is enqueued in a MAC queue 22 upon receipt of all data cells for the frame as indicated by an unbroken sequence of sequence numbers 56 for the received sequence numbers 56 of the received data cells provided that no data cells of an earlier sequence number 56 of a partially received data frame have been received. Other methods for monitoring the integrity of the data frames may be used as known to those of ordinary skill in the art.

FIGS. 4a and 4b illustrate the formats of a data cell created from a data frame received at an input port 2. In the illustrated embodiment, a data cell payload 60 carries 64-bytes of frame header information added by the associated LUE 9 and/or the Ethernet frame data. The size of the data cell is determined from a desired payload size, cell header and cell trailer size. In the illustrated embodiments, this is accomplished in a 79-byte cell. Such data cells carried on the links also include a one-byte "idle" separator to yield an 80-byte cell time. This embodiment provides non-blocking wire-rate forwarding for Ethernet frames when datapath 1 is twice the speed of data path 7, and path 7 is at least as fast as the aggregate data rate of the MAC devices connected to a switch fabric port. The input port 2 creates the cell header with sufficient information for frame reassembly at the destination output port 4. The input port 2 may use the address of the destination output port 4 to place the frame into the correct VOQ 14 (FIG. 3) corresponding with the destination output port 4 along with priority information included within the frame header.

The data cell 50 of FIG. 4a, having a destination port field 52, illustrates a format of a data cell 50 being transmitted from an input port 2 to a crossbar section 100 according to an embodiment. The physical link transmitting this cell inherently indicates the source input port 2 to the receiving crossbar section 100. The receiving crossbar section 100 uses the destination port information 52 to place the cell into a correct output queue as discussed below with reference to FIG. 6. The receiving crossbar section saves information identifying the inherent source port when storing the cell in buffer 102. The data cell 51 of FIG. 4b, having a source port field 54 instead of a destination port field (determined from the physical link transmitting the data cell to the crossbar section 100), illustrates a format of a data cell 51 being transmitted from a crossbar section 100 to an output port 2. The receiving output port 4 uses the source port information 54 and the sequence number 56 to reassemble the frames. An error check field 62 is used by the crossbar 6 and the output port 4 to detect errors in the links into and out of the crossbar 6. All other routing data (e.g., VLAN and MAC addresses) may be included within the frame header created by the LUE 9 and transmitted to the input port on data path 7.

In the illustrated embodiment, each input port 2 maintains a sequence number 56 for each output port 4. The sequence number size is preferably significantly larger than the total number of cells that can be in transit through the crossbar 6 at any one time. This allows a moving window within the sequence number range to be used in error detection protocols. The sequence number 56 is incremented for each subsequent data cell forwarded to the fabric for the associated output port 4. The sequence number 56, therefore, indicates an ordinal position of the data cell among the data cells making up the partitioned data frame payload.

According to an embodiment, when the input port 2 begins forwarding a frame to an output port 4 (i.e., transmits an initial first data cell of the frame), the input port 2 completes transmission of the frame (i.e., transmission of all data cells having sequence numbers in the range of sequence numbers defining the data frame) even if input port 2 receives a higher priority frame having a destination associated with that output port 4. This ensures that the sequence numbers of a frame are contiguous, and that all priority queues to the output port 4 can use the same sequence number maintained for transmission of data cells from the input port 2 to the output port 4. It also simplifies reassembly by reducing the number of frames and cells that can arrive out of order.

Each output port 4 sorts forwarded data cells 51 based upon the field source port 54 and sequence number 56 (FIG. 4b). The sequence number 56 can be used to determine the ordinal position of the data payload of a forwarded data cell 51 within the data payload of the reconstructed frame. Algorithms known to those skilled in the art can then be used to recognize whether frames are complete, and determine whether there are any incomplete frames to be forwarded first (to be placed in a MAC transmission queue 22 (FIG. 3)). The output port 4 may use ASIC based reassembly buffers to support the receipt of data cells in the output buffer RAM 19 at the aggregate rate of the crossbar 6 through the links connected to the output port 4, or directly reassemble the frame in RAM 19. Either method benefits by decreasing the number of outstanding cells.

According to an embodiment, the VOQs 14 at the input ports 2 and MAC queues 22 at the output ports 4 may be adapted to support priority schemes. For example, the frame reassembler 18 and the MAC queuer 20 at the output ports 4 may implement priority schemes for meeting the requirements of the MAC protocol and IEEE Standard 802.1.

The output logic at the output port 4 may implement any one of several algorithms for determining the priority of frames to be transmitted to a particular MAC device. For example, the output port 4 may implement a MAC queue 22 with four priority levels where each frame is placed in a proper corresponding queue associated with one of the four priorities. Additional schemes may include round robin, pure priority and weighted access schemes. The output port 4 may implement a frame discard scheme to prevent MAC output starvation resulting from gross congestion conditions. Such a discard scheme may be selectable between random early discard (RED) and weighted random early discard (WRED). According to an embodiment, the size of the output buffer may be optimized based upon the particular data rate of physical links from the crossbar 6 and the number and data rate of MAC devices connected to the input ports 2 and the output port 4.

FIG. 5 shows an embodiment of the switching fabric including a set number of crossbar sections 100 which make up the crossbar 6. Input ports 2a through 2z have a communication link to each of the crossbar sections 100. Similarly, each of the output ports 4a through 4z have a communication link to each of the crossbar sections 100 of the crossbar 6. In the illustrated embodiment, each of the links coupling an input port 2 to a crossbar section 100 or coupling a crossbar section 100 to an output port 4 transmits data at a data rate (e.g., 16.0 Gps) which is twice that of the data being received at the input ports 2 (e.g., 8.0 Gbps).

Figure 6:
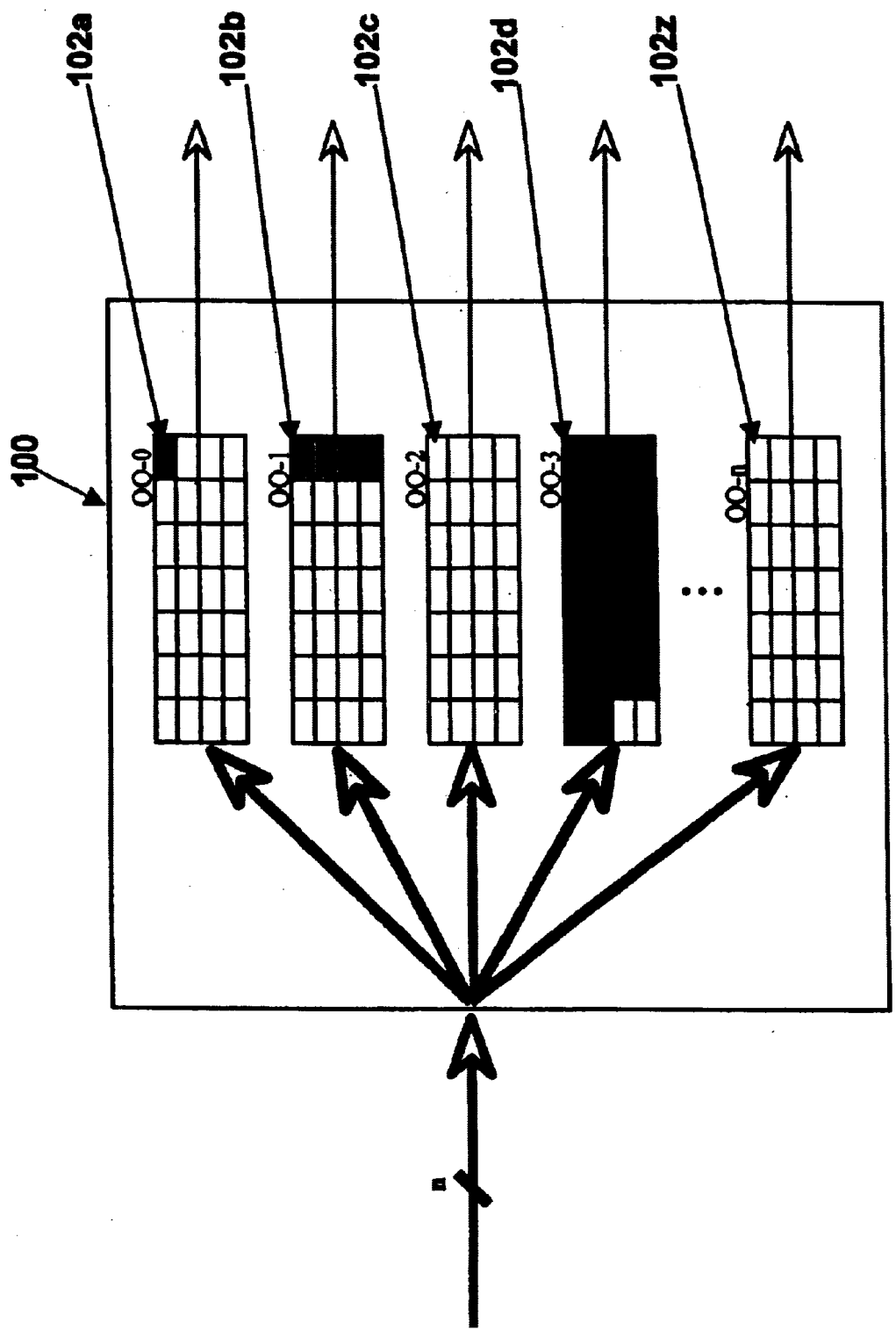
FIG. 6 illustrates an embodiment of a crossbar section of the switching fabric of FIG. 2 using cell buffers for maintaining a queue for each associated output port.

In the illustrated embodiment, each of the sections 100 of the crossbar 6 maintain one output queue per output port 4. These queues map one to one with the links to the output ports 4. Each input port 2 transmits data cells to the sections 100 of the crossbar independently to enable efficient operation and modular implementation. For example, the loss of a link connecting an input port 2 to a crossbar section 100 does not prevent the crossbar section 100 from being used by any other input port 2. Similarly, the loss of a crossbar section 100 does not prevent the load at the input ports 2 from being distributed among the remaining crossbar sections 100. FIG. 6 illustrates the outport queues 102 which are maintained in a representative crossbar section 100 of the crossbar 6 shown in FIG. 5. The crossbar section 100 maintains output queues 102a through 102z, each output queue 102 corresponding to one of the output ports 4.

Data cells are transmitted from the input ports 2 to the crossbar sections 100, and from the crossbar sections 100 to the output ports 4 at set cell intervals. On every cell interval, each input port 2 independently determines, for each link to a crossbar section 100, which VOQ 14, if any, is to be serviced. Accordingly, it is possible for all input ports 2 to simultaneously forward a data cell to the same output queue 102 in a crossbar section 100. Therefore, each output queue 102 in a crossbar section 100 preferably includes, at a minimum, capacity for one-cell per input port 2.

FIG. 6 shows the crossbar section 100 receiving data cells from each of the input ports 2. In the embodiment of FIG. 6, each of the output queues 102 can enqueue up to a set number of data cells. The number of cell buffers in each output queue 102 is preferably greater than the number of input ports 2. Otherwise, the output links to the output ports 4 may not be driven at a maximum rate. On the other hand, the frame reassembly logic at the output port 4 becomes increasingly complex as the number of cell locations in an output queue 102 increases. Therefore, the recommended number of cell locations per output queue 102 is greater than the number of input ports 2 but less than twice the number of input ports 2.

A data cell received on any of the input links from the input ports 2 may be written to any of the output queues 102. Logic at the receiving end of the crossbar section 100 may account for a delay sufficient to examine the header of the incoming data cells and determine the output queue 102 to enqueue the incoming data cell. Data cells waiting in the output queues 102 are subsequently transmitted to the corresponding link dedicated to the corresponding output port 4.

As discussed above, the input ports 2 partition the data payload of received frames into data cells as illustrated in the format shown in FIG. 4a. The output ports 4 receive the data cells to reconstruct the frame at frame reassembler 18 (FIG. 3). Data cells of any particular frame may be distributed among the different sections 100 of the crossbar 6 before being subsequently forwarded to the output port 4 associated with the destination of the frame. Because each input port 2 independently forwards data cells to the crossbar sections 100 to distribute its load among the crossbar sections 100, it is possible for load patterns to alter the order of the arrival of data cells arriving at the destination output port 4. This may occur in situations, for example, when the instantaneous load to one crossbar section 100 is larger than that for other crossbar sections 100.

Minimizing the number of cell buffers within each output queue 102 within each crossbar section 100 reduces the complexity of the frame reassembler 18. The frame reassembler 18 preferably provides sufficient cell buffering to maintain the data rate from the crossbar 6 into the output buffer RAM 19 without cell loss (e.g., if a frame discard need be performed when MAC devices are congested, causing the output buffer RAM 19 to fill not because of the forwarding rate from the crossbar). If the data can be maintained only by writing pages or similar blocks of information to the output buffer RAM 19, then the reassembly implementation may accommodate the worst case of data cells 51 of particular frames arriving out of order.

According to an embodiment, frames arriving at any of the input ports 2 may be multi-cast frames which are to be broadcast among all or a subset of the output ports 4 and MAC queues 22. Here, the receiving input port 2 transmits a copy of the frame through the crossbar 6 for each destination output port 4. Each receiving output port 4 may then make additional copies for multiple MAC queues 22 associated with the receiving output port 4.

The data paths 7 into the switching fabric and data paths 5 out of the switching fabric service an aggregation of MAC addresses. This may create potential for the switching fabric to exhibit characteristics of blocking behavior for individual MAC ports. This happens if one MAC device is allowed to consume the entire output buffer 19 of its output port 4. This could result in other MAC devices on the output port 4 having their data rate restricted. This problem may be avoided if buffering is guaranteed for a particular MAC queue 22. This can be accomplished by using a frame discard protocol or reserving buffer space for each MAC queue 22 which are techniques known to those of ordinary skill in the art.

Figure 7:
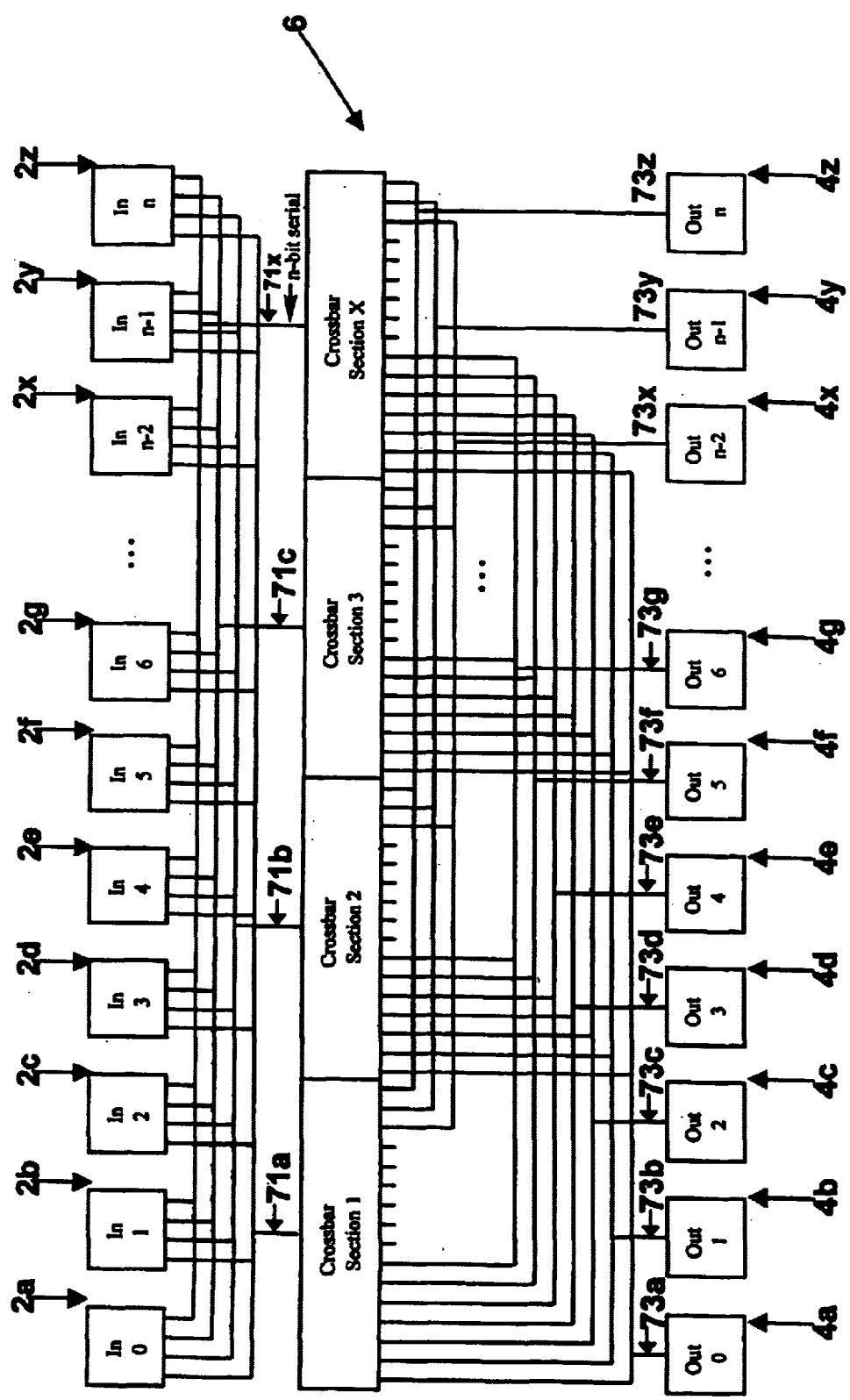
FIG. 7 illustrates the flow of control signals via data busses interconnecting elements of an embodiment of the switching fabric shown in FIG. 1.

Each output port 4 indicates its ability to accept additional data cells by signaling to the crossbar sections 100. The crossbar sections 100 transmit signals to the input ports 2 to indicate the ability of the crossbar section 100 to accept additional data cells. Each crossbar section 100 transmits a bit vector to each input port 2 at each cell interval, indicating the ability of the crossbar section 100 to receive a data cell at each of its output queues 102 in the following cell interval. The output ports 4 provide similar signaling to each of the crossbar sections 100. This provides capability to reduce congestion at the output ports 4 by controlling data being transmitted at the input ports 2. In each interval, each output port 4 transmits a signal to all of the crossbar sections 100 to indicate its ability to accept additional data cells in the following cell interval. The output port 4 does not signal that it is ready to receive additional data cells if there are insufficient buffers to receive a data cell from every crossbar section 100. FIG. 7 illustrates one embodiment for transmitting signals from each of the output ports 4 to the crossbar sections 100 indicating an availability to accept data cells from the crossbar sections using control busses 73, and transmitting the bit vector from each of the crossbar sections to each of the input ports 2 using control busses 71. In this embodiment control signals are transmitted directly on data busses from each output port 4 to each crossbar section 100, and from each crossbar section 100 to each input port 2.

In an alternative embodiment, the crossbar sections 100 and output ports 4 transmit such control signals in the forward data stream through the data links 3 and 5 (FIG. 2). Each of the output ports 4 may be coupled to its corresponding input port 2 control information received from the crossbar over data links 3 (equivalent to the control signals of control busses 71) or to provide control signals to output ports 4 (equivalent to the control signals of control busses 73) for transmission to the crossbar 100 over data links 1.

Each input port 2 may use each bit vector received from a crossbar section 100 to schedule a cell transfer on the data link between the crossbar section 100 and the input port 2 in the next cell interval. With each input port 2 being able to independently determine data cells which it forwards to a particular crossbar section 100, it is possible for all input ports 2 to simultaneously forward traffic to the same output queue 102 (of a crossbar section 100). Therefore, a crossbar section 100 preferably does not signal that it is ready to receive data at any particular output queue 102 unless it can receive at least one cell for that output queue 102 (corresponding to a particular output port 4) from every input port 2.

As discussed above, each input port 2 maintains at least one VOQ 14 for each output port 4 for data frames having a destination associated with the output port 4. One embodiment of the input port 2 maintains multiple (e.g., four) VOQs 14 for each output port 4, one VOQ 14 for each separate priority. When a unicast frame is received (on data path 7) at an input port 2, its header is examined to determine the output port 4 of the destination and the frame's priority. It is then placed in the appropriate VOQ 14 associated with the output port 4. Frames within a VOQ 14 may be serviced in a FIFO or other scheduling order known to those of ordinary skill in the art. A forwarding arbitration protocol of the input port 2 determines the order in which VOQs 14 are serviced. The procedure of the illustrated embodiment ensures that frames enter the crossbar 6 meeting the ordering requirement of the IEEE standard 802.1. When a multicast frame is received at the input port 2, its header is examined to determine the destination output ports 4. The frame can then be placed in the VOQ 14 of an appropriate priority for each destination output port 4.

Each input port 2 examines the frame header of each received data frame to determine if the frame should be filtered or forwarded. If the frame is to be forwarded, the input port 2 may also copy the data frame for transmission to multiple output ports 4 (e.g., where a multicast frame is copied to each output). Frames to be forwarded to an output port 4 are placed in a VOQ 14 of the output port 4 corresponding to the frame priority.

Use of the mesh interconnection input ports 2 to the independent crossbar sections 100 of the crossbar 6 achieves its desired increase speed from S to two times S (e.g., 8.0 Gbps to 16.0 Gbps) by fully utilizing the data links 1 from the input ports 2 to the crossbar sections 100. Each of the data links 1 (e.g. data link 1z) from any input port 2 may transfer a data cell from the same frame, each from a different frame or any combination thereof. The application of a priority scheme, therefore, may be performed on a per frame basis to prevent deadlock and reduce the complexity of the frame reassemblers 18. Once initiated, preference may be given to completing a partially transmitted frame rather than starting a new frame. The transmission of data cells for subsequent new data frames may be scheduled for the VOQs 14 of other output ports 4 in a round robin order. This prevents a partially transmitted frame from blocking a frame destined for a different output port 4. The frame selector 16 at the input port 2 may determine whether to forward a data cell in the VOQ 14 to a crossbar section 100 based upon the status of the first data frame in the VOQ 14 (i.e., whether any data cells have been transmitted to the crossbar 6) of a particular output port 4 and the readiness of the crossbar section 100 (i.e., from the bit vector). Once transfer of a frame has been initiated, the input port 2 preferably does not start forwarding data cells of any other frames for the target output port 4 until all data cells of the frame are, or are being, transferred into the crossbar 6. The single frame per output port 4 processing simplifies the reassembly processes at the output port 4.

Figure 8:
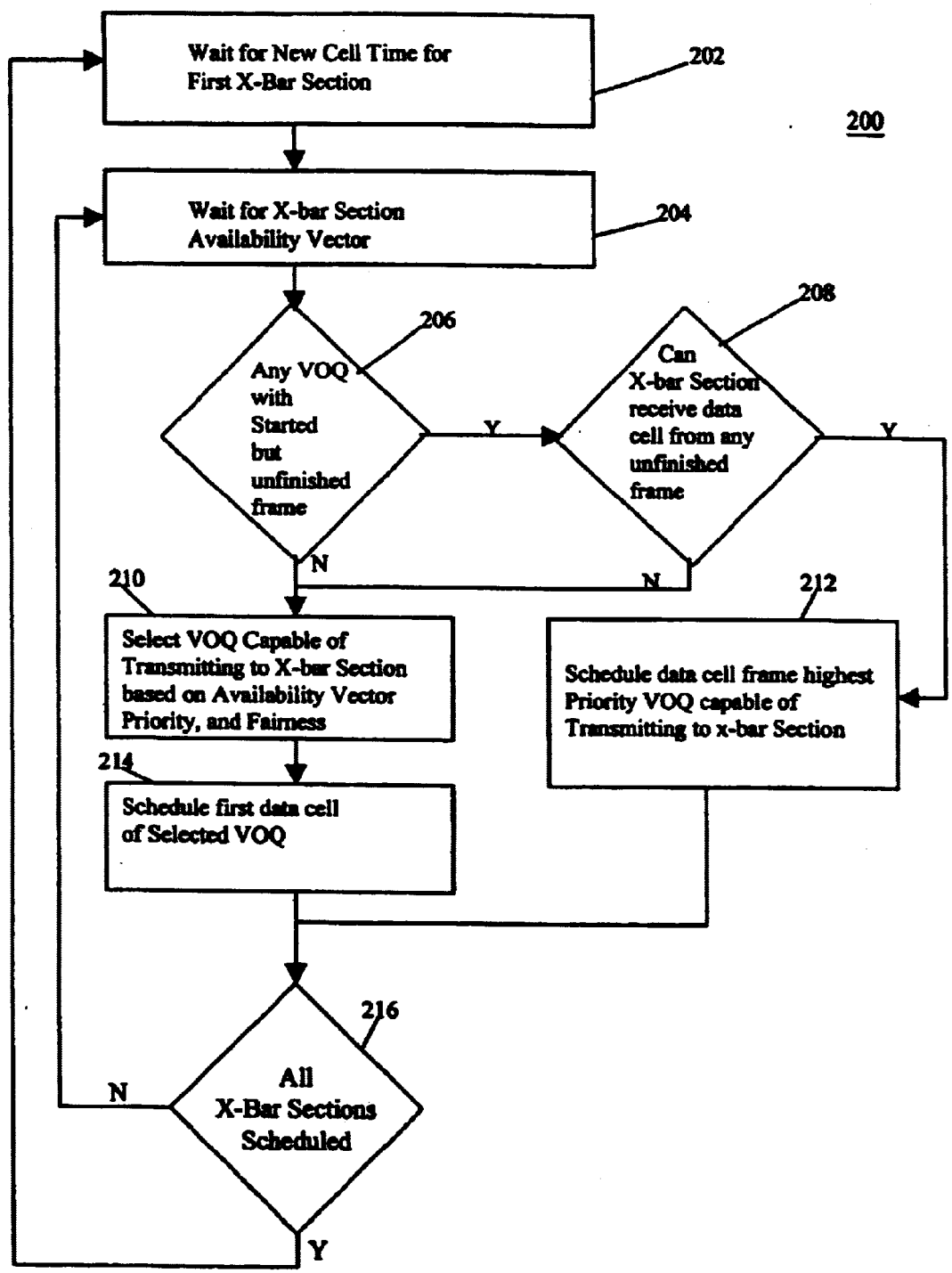
FIG. 8 illustrates logic at the input ports for scheduling the transmission of data cells to crossbar sections.

FIG. 8 shows a functional flow diagram illustrating logic executed in the frame selector 16 of an embodiment of the input port 2. The selection may be performed sequentially for each crossbar section 100 and repeated each cell time. At step 202, the input port 2 corresponding to the frame selector 16 waits for the start of a new cell time for the first crossbar section (e.g., crossbar section 100a). In step 204, the selector frame 16 receives a bit vector from the current crossbar section 100 indicating the ability of the crossbar section 100 to receive data cells for transmission to particular output ports 4. At steps 204 through 216, the frame selector 16 schedules the transmission of data cells on each of the data links 1 connecting the input port 2 to the crossbar section 100. Step 206 determines whether there are any partially transmitted data frames in any of the VOQs 14. If there are any such partially transmitted data frames, step 208 determines whether the crossbar section 100 can receive a data cell from any of the partially transmitted data frames. That is, based upon the output ports 4 associated with the destinations of the partially transmitted data frames, step 208 determines whether the crossbar section 100 can receive any data cells for these destinations based upon the bit vector of the crossbar section 100 received at step 202. If the crossbar section 100 can receive a data cell from any of the partially transmitted data frames, step 212 schedules a data cell from a partially transmitted data frame having the highest precedence.

If there are no partially transmitted frames to be transmitted to the crossbar section as determined at steps 206 and 208, step 210 selects a VOQ 14 associated with an output port 4 capable of transmitting to the crossbar section based upon the bit vector received at step 204 having the highest priority and maintaining fairness within the priority. Step 214 then schedules the first data cell of the first data frame (i.e., the highest priority) of the VOQ 14 associated with an output port 4. If no cell can be scheduled in step 214, an empty cell may be transmitted. When the frame selector 16 has scheduled a transmission of a data cell on each of the data links 3 coupled to a crossbar section 100 as determined by step 216, step 202 awaits a new cell transfer cycle.

As pointed out above, several different types of priority algorithms can be employed at either the input ports 2 or the output ports 4. The input ports 2 may use priority schemes to arbitrate how frames having destinations associated with the same output port 4 are to be scheduled for transmission to the crossbar 6 on the data links 3. The input ports 2 may also use priority schemes to arbitrate the scheduling of data cells from among VOQs 14 of data frames having destinations associated with different output ports 4. Priority schemes at the input ports 1 may include round robin, pure priority, weighted priority or weighted access. The output ports 4 may use priority schemes in selecting which reassembled frames are to be forwarded to the MAC devices from the MAC queues 22. Congestion at a single output MAC address can cause starvation of other MAC addresses of the output port 4 when the buffer is not available to forward cells from the crossbar 6 to an uncongested MAC address. This condition may be prevented by enabling one of many possible output port discard protocols including random early discard (RED), weighted random early discard (WRED) and tail drop.

Priority algorithms may be uniform for the frame selector 16 of each of the input ports 2 and the MAC queues 20 of each of the output ports 4. However, the illustrated embodiments enable the hardware to independently specify a priority scheme for each input port 2 and each output port 4 since each input port 2 and output port 4 may be a separate integrated circuit. At an input port 2, the frame selector 16 may apply priorities for the data frames within each VOQ 14. In the output ports 4, the priority schemes are applied by the MAC queuer 20 to each of the MAC queues 22.

The architecture of the switching fabric illustrated in FIG. 5 provides additional advantages of modularity and scalability. First, each pair of an input port 2 and output port 4 (i.e., input port 2 and output port 4 coupled to the same MAC device) and crossbar sections 100 can operate independently as each of these components can be formed in a separate integrated circuit package. The entire switching fabric may then be enclosed within a chassis or distributed over a stack of chassis. Second, the topology of the switching fabric can be scaled to implement several fabric sizes. In other embodiments, the topology may reside on a single board, or single board plus daughter board implementation. The switch fabric performance may be determined by port/link speed, and the topology may be scaled using a different number of crossbar sections 100 and ports as illustrated in the examples of Table 1 below.

TABLE 1

| NUMBER OF CROSSBAR SECTIONS | LINK SPEED (Gbps) | NUMBER OF PORT PAIRS | BANDWIDTH (Gbps) | THROUGHPUT (Gbps) |
| --- | --- | --- | --- | --- |
| 8 | 2 | 48 | 1536 | 384 |
|   | 1 | 26 | 416 | 104 |
| 4 | 2 | 24 | 768 | 192 |
|   | 1 | 13 | 208 | 52 |

TABLE 1-continued

| NUMBER OF CROSSBAR SECTIONS | LINK SPEED (Gbps) | NUMBER OF PORT PAIRS | BANDWIDTH (Gbps) | THROUGHPUT (Gbps) |
| --- | --- | --- | --- | --- |
| 2 | 2 | 12 | 384 | 96 |
|   | 1 | 6.5 | 104 | 26 |
| 1 | 2 | 6 | 192 | 48 |
|   | 1 | 3.25 | 52 | 13 |
| Ø | 2 | 1 | 32 | 8 |
|   | 1 | 1 | 8 | 4 |

When the crossbar 6 is scaled to smaller sizes, each crossbar section 100 receives two, four or eight links from each input port. Each of these links corresponds with a different cell phase relationship. Flow control signaling may be maintained by having each crossbar section 100 transmit multiple flow control vectors to accurately report the availability of output queues 102 (FIG. 6). Alternatively, each crossbar section 100 may maintain additional output queues 102. The later method can be implemented by ignoring the additional output queues 102 for reporting availability (e.g., only reporting the ability to receive twenty-six cells when there are actually thirty-three cell locations empty).

The segmentation and reassembly function relates to the fabric size. The maximum number of ports along with thresholds for signaling buffer availability determine the requirements for the reassembly buffer and sequence number range.

The frame reassembler 18 may be simplified by constraining the input port frame selector 16 to complete transmission to the crossbar 100 of a frame for a destination output port 4 before initiating transmission of a newly arriving higher priority frame. It may also simplify by limiting the number of buffers in a crossbar section output queue 102.

The frame reassembly 18 may be implemented to accommodate the worst case out of order cell delivery. Using the described embodiment, this can occur in a burst of frames, when all input ports 2 transfer a cell to the same crossbar section 100 destined for the same output port 4. In this case, all cells are buffered in the same output queue 102 of the crossbar section. If all but the last input port 2 to have its cell buffered in output queue 102 transfer minimum size frames (i.e., contained within a single cell) and the last input port 2 to have its cell buffered in output queue 102 transfers a maximum sized frame, the first cell of the maximum sized frame cannot be delivered until the other cells are delivered to the output port 2. If the maximum size frame is then distributed to the other sections of the crossbar, and the other input ports have no additional frames to forward, the second cell of the maximum size frame will be buffered at the front of the output queue 102 of the next crossbar section 100. This is repeated for the other crossbar sections. Therefore, many of the subsequent cells of the maximum size frame will arrive at the output port 2 before the first cell of the frame. In addition, the first cell can be delayed by the maximum number of cells in the output queue 102 when the crossbar section 100 will still signal availability to accept cells from all input ports 2.

In alternative embodiments, the switching fabric includes counters at the input ports 2, output ports 4 and the crossbar sections 100 to support common management protocols. Control registers support the reporting of counts in specially addressed cells which are transmitted to specific MAC addresses coupled to selected output ports 4. In other embodiments, a microprocessor interacts with one or more of the components of the switching fabric to receive count information directly.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of transmitting data frames to a plurality of output ports, each of the data frames having a destination associated with one of the output ports, the method comprising:

at each of a plurality of input ports, partitioning a portion of each data frame to provide one or more ordered data cells having data representative of a sequence number corresponding with the output port associated with the destination of the data frame, the data representative of the sequence number in each data cell indicating an ordinal position of the data cell among the ordered data cells of the data frame, maintaining the sequence number corresponding to each output port, transmitting the ordered data cells of data frames having a destination associated with the output port sequentially, one ordered data cell at a time, and incrementing the sequence number for each subsequent ordered data cell transmitted to the output port from the input port; and at each of the output ports, receiving a forwarded data cell for each ordered data cell associated with each data frame having a destination associated with the output port, each forwarded data cell corresponding with an ordered data cell and a data frame associated with the ordered data cell, and determining an ordinal position of the forwarded data cell among forwarded data cells associated with the data frame based upon data in the forwarded data cell representative of the sequence number.

2. The method of claim 1, the method further comprising:

at a crossbar, receiving ordered data cells transmitted from each of the input ports and enqueuing up to a maximum number of received ordered data cells of data frames having a destination associated with any one particular output port; and at each input port, restarting the sequence number for each output port following a transmission of at least the maximum number of ordered data cells of data frames that can arrive out of order having a destination associated with the output port.

3. The method of claim 1, the method further comprising, for at least one input port:

receiving a first data frame having a destination associated with a particular one of the output ports, the first data frame having a priority for transmission to the particular output port;

transmitting ordered data cells of the first data frame to a crossbar;

while transmitting the ordered data cells of the first data frame, receiving a second data frame having a destination associated with the particular output port and having a priority for transmission to the particular output port higher than the priority for transmitting the first data frame to the particular output port; and completing the transmission of each ordered data cell of the first data frame to the crossbar prior to a transmission of any ordered data cell of the second data frame to the crossbar.

4. The method of claim 1, wherein each forwarded data cell received at the output ports includes source information identifying the input port providing the ordered data cell associated with the forwarded data cell, the method further including at the output port:

associating each received forwarded data cell with an input port based upon the source information in the received forwarded data cell;

for each received forwarded data cell associated with an input port, determining an ordinal position of the received forwarded data cell among forwarded data cells associated with a data frame based upon the sequence number in the received forwarded data cell.

5. The method of claim 1, wherein each forwarded data cell received at the output ports includes source information identifying the input port providing the ordered data cell associated with the forwarded data cell, the method further including at the output port:

associating each received forwarded data cell with an input port based upon the source information in the forwarded data cell;

for each received forwarded data cell associated with an input port, determining an ordinal position of the received forwarded data cell among forwarded data cells associated with a data frame based upon the sequence number in the received forwarded data cell.

6. A data switch, comprising:

a plurality of output ports for transmitting forwarded data frames to destinations;

a plurality of input ports for receiving data frames, each received data frame having a destination associated with one of the output ports, each of the plurality of input ports including logic for partitioning a portion of each received data frame to provide one or more ordered data cells having data representative of a sequence number corresponding with the output port associated with the destination of the received data frame, the data representative of the sequence number in each ordered data cell indicating an ordinal position of the ordered data cell among the ordered data cells of the data frame, logic for maintaining the sequence number corresponding to each output port, logic for scheduling transmission of the ordered data cells of received data frames having a destination associated with the output port sequentially, one data cell at a time, and logic for incrementing the sequence number for each subsequent ordered data cell transmitted to the output port from the input port, wherein each of the output ports receives forwarded data cells, each forwarded data cell corresponding with an ordered data cell generated at one of the input ports and having data indicative of the sequence number of the corresponding ordered data cell, and includes logic for determining an ordinal position of the forwarded data cell among the forwarded data cells of a forwarded data frame based upon the data indicative of the sequence number in the forwarded data cell.

7. The data switch of claim 6, wherein each of the ordered data cells includes a data payload having a portion of a data payload of a corresponding received data frame, and wherein the data switch further comprises a crossbar for receiving ordered data cells from the input ports and, for each received ordered data cell, transmitting a forwarded data cell having the data payload of the received ordered data cell to an output port associated with the destination of the received data frame corresponding with the received ordered data cell.

8. The data switch of claim 6, wherein the crossbar is capable of buffering up to a maximum number of received ordered data cells of received data frames having a destination associated with any one particular output port, and wherein each input port further includes logic for restarting the sequence number for each output port following the transfer of at the maximum number of ordered data cells of received data frames which can arrive out of order having a destination associated with the output port.

9. The data switch of claim 6, wherein each input port further includes:
  logic for scheduling transmission of ordered data cells of a first received data frame to a particular output port associated with the destination of the first received data frame, the first received data frame having a priority for transmission to the particular output port; and
  logic for completing the transmission of each of the ordered data cells of the first data frame to the output port prior to a transmission of any ordered data cell of a second received data frame to the output port, the second received data frame having a destination associated with the output port and the second received data frame having a priority for transmission to the particular output port higher than the priority for transmitting the first data frame to the particular output port.

10. The data switch of claim 6, wherein each outbound data cell received at the output ports includes source information identifying the input port transmitting the associated data cell to the crossbar, and the output ports further include:
  logic for associating each received outbound data cell with an input port based upon the source information in the received outbound data cell; and
  for each received outbound data cell associated with an input port, logic for determining an ordinal position of the received outbound data cell among outbound data cells associated with a data frame based upon the sequence number in the received data outbound data cell.

11. In a data communication network including a plurality of host computers for transmitting data packets to a plurality of network devices, each of the data packets having data representative of a destination network address, each of the network devices having a media access control (MAC) address associated therewith, the improvement including:
  a plurality of output ports, each of the output ports being coupled to at least an associated one of the network devices for transmitting MAC data frames to the at least one network device according to the MAC address associated therewith;
  a look-up engine for receiving the data packets from the host computers addressed to one or more of the network devices and forming intermediate data frames based upon the data packets, the intermediate data frames having a data payload and information identifying an output port associated with the one or more network devices;
  a plurality of input ports for receiving the intermediate data frames from the look-up engine, each received intermediate data frame having a destination associated with one of the output ports, each of the plurality of input ports including logic for partitioning the data payload of each received intermediate data frame to provide one or more ordered data cells having data representative of a sequence number corresponding with the output port associated with the destination of the received intermediate data frame, the data representative of the sequence number in each ordered data cell indicating an ordinal position of the ordered data cell among the ordered data cells of the intermediate data frame, logic for maintaining the sequence number corresponding to each output port, logic for scheduling transmission of the ordered data cells of the received intermediate data frames having a destination associated with the output port sequentially, one data cell at a time, and logic for incrementing the sequence number for each subsequent ordered data cell transmitted to the output port from the input port,
  wherein each of the output ports receives forwarded data cells, each forwarded data cell corresponding with an ordered data cell originating at one of the input ports and having data indicative of the sequence number of the corresponding ordered data cell, and includes logic for determining an ordinal position of the forwarded data cell among the forwarded data cells of a forwarded data frame based upon the data indicative of the sequence number in the forwarded data cell.

12. The data communication network of claim 11, wherein each of the ordered data cells includes a data payload having a portion of the data payload of a corresponding received intermediate data frame, and wherein the improvement further comprises a crossbar for receiving ordered data cells from the input ports and, for each received ordered data cell, transmitting a forwarded data cell having the data payload of the received ordered data cell to an output port associated with the destination of the received intermediate data frame corresponding with the received ordered data cell.

13. The data communication network of claim 11, wherein the crossbar is capable of enqueuing up to a maximum number of received ordered data cells of received intermediate data frames having a destination associated with any one particular output port, and wherein each input port further includes logic for restarting the sequence number for each output port following the transfer of at least the maximum number of ordered data cells of received intermediate data frames that can arrive out of order having a destination associated with the output port.

14. The data communication network of claim 11, wherein each input port further includes:
  logic for scheduling transmission of ordered data cells of a first received intermediate data frame to a particular output port associated with the destination of the first received intermediate data frame, the first received intermediate data frame having a priority for transmission to the particular output port; and
  logic for completing the transmission of each of the ordered data cells of the first received intermediate data frame to the output port prior to a transmission of any ordered data cell of a second received intermediate data frame to the output port, the second received intermediate data frame having a destination associated with the output port and the second received intermediate data frame having a priority for transmission to the particular output port higher than the priority for transmitting the first received intermediate data frame to the particular output port.

15. The data communication network of claim 11, wherein each forwarded data cell received at an output port includes source information identifying the input port providing the ordered data cell associated with the forwarded data cell, and wherein the output ports further include:

logic for associating each received forwarded data cell with an input port based upon the source information in the received forwarded data cell; and for each received forwarded data cell associated with an input port, logic for determining an ordinal position of the received forwarded data cell among forwarded data cells associated with a data frame based upon the sequence number in the received forwarded data cell.

\* \* \* \* \*